Patented Aug. 15, 1939

2,169,250

UNITED STATES PATENT OFFICE 2,169,250

PROCESS OF FORMING FILMS, THREADS, AND THE LIKE

Emmette F. Izard, Kenmore, N. Y., assignor to E. I. du Pont de Nemours & Company, Wilmington, Del., a corporation of Delaware No Drawing. Application May 27, 1937, Serial No. 145,117

8 Claims. (Cl. 18—54)

This invention relates to the formation of films, threads, caps, bands, tapes, ribbons, cords, bristles, sausage casings, and the like. More particularly, it relates to the formation of films and threads from polyvinyl alcohol compositions in such a fashion that the ultimate product is insoluble in water and all common solvents.

In recent years there have been put upon the market in large quantities, synthetic sheets, films, threads, and other articles made from various types of materials such as certain resins, regenerated cellulose, cellulose derivatives, and others. One of the most recently developed of these materials has been polyvinyl alcohol, which is characterized by several unique properties. It is extremely tough, flexible, and transparent and has very high elongation. However, it has several distinct disadvantages, notably its low resistance to water, typified by the fact that it is completely soluble in hot water. Nevertheless, it is extremely advantageous to be able to cast a film from a water solution. It has hitherto been known to produce articles of varying degrees of solubility by reacting polyvinyl alcohol with various materials such as formaldehyde. This treatment has the disadvantage that the resulting film, although insoluble in water, is still soluble in many organic solvents. Furthermore, it requires an additional treatment step and the employment of a reagent after the film has been formed.

It is, therefore, an object of this invention to form films, threads, and the like from polyvinyl alcohol compositions in such a way that the ultimate product is insoluble in hot and cold water and in all common solvents. It is a further object to form such films without any chemical after-treatment other than the employment of heat. Further objects will appear hereinafter.

These objects are accomplished in general by forming a solution comprising polyvinyl alcohol and a compound capable of forming a cross-linked structure with polyvinyl alcohol, forming said solution into a film, thread, or the like, and converting the resulting film, thread, or the like into a form insoluble in water and all common solvents. By the term "compound capable of forming a cross-linked structure" is meant a compound capable of reacting with two or more polyvinyl alcohol molecules to form a complex molecule. By further reaction with additional molecules of the compound capable of forming a cross-linked structure, said complex molecule can be built up to form a very long-chain structure comprising a number of polyvinyl alcohol units linked together by a number of units of the compound capable of forming a cross-linked structure. For convenience sake the "compound capable of forming a cross-linked structure with polyvinyl alcohol under the influence of heat" will be referred to throughout the present specification and claims as a "cross-linking compound". Examples of such compounds are polycarboxylic acids and particularly dicarboxylic acids in which the carboxyl groups are separated by at least two carbon atoms, such as sebacic, succinic, maleic, glutaric, adipic, pimelic, tartaric, citric, aconitic, tricarballylic, dilactic, diglycolic, malic, and suberic acids among the aliphatic acids and phthalic, tere-phthalic and 1,2-dihydronaphthalene dicarboxylic acids among the aromatic acids. Other suitable cross-linking compounds are the aldehydes corresponding to the aforementioned acids, such as succinaldehyde, water-soluble dimethylolurea resin, certain polyhalogenated compounds, such as 2,3-dichloro dioxane, 2,3-di-iododioxane, 2,3-dibromodioxane, acid chlorides of the abovementioned dicarboxylic acids, 1,3-dichlorohydrin, alpha alpha dichlorinated ethers, such as dichloro dimethyl ether and alpha alpha dichloro diethyl ether, and the like.

Among the polycarboxylic acids in which the carboxyl groups are separated by at least two carbon atoms is polymerized acrylic acid and its homologues substituted in the alpha position by a hydrocarbon radical, such as an alkyl radical, particularly polymerized methacrylic acid. Despite the fact that both polyvinyl alcohol and polymerized acrylic acid or homologues thereof are soluble in water, it is extremely difficult to cause them to mix or to react to form a cross-linked structure. It has now been found, however, that by adding methacrylic acid, its higher homologues or acrylic acid in the monomeric form to a solution of polyvinyl alcohol, polymerizing the said acid in situ by the use of heat and/or a polymerization catalyst such as benzoyl peroxide, forming a film, thread or the like therefrom and then heating the thus formed film, thread, or the like, an insoluble cross-linked structure between polyvinyl alcohol and polymethacrylic acid is formed.

Any desired type of polyvinyl alcohol of any convenient viscosity, such as 15 to 75 centipoises (preferably 18 to 40 centipoises in 4% solution at 20° C.) may be employed in the practice of this invention. Polyvinyl alcohol is generally produced by hydrolysis of polyvinyl acetate and either completely hydrolyzed or partly hydrolyzed products may be used. If only partly hydrolyzed products are used, the quantity of unsaponified ester and/or acetal type group must be small enough so that the product will still be soluble in hot water. Substituted polyvinyl alcohols such as polymethylvinyl alcohol may also be used.

The compositions are converted into threads or films in any fashion well known to the art. They can be cast or spun into an evaporative atmosphere in order to cause the solvent water to evaporate or into a suitable coagulating bath such as is disclosed in copending application to Izard and Kohn, Serial No. 145,118, filed of even date herewith. In either method it may be cast continuously or discontinuously. In the continuous method of casting or spinning, the film or thread-forming composition is led into an evaporative atmosphere and then conducted, if necessary, through various treating baths. In casting film, the composition is preferably cast on to a heated casting surface such as a metal wheel or continuous belt, the film stripped therefrom after the solvent water is evaporated and then treated to wash or purify the same. Alternatively, a film may be formed by casting the composition on to a glass plate and immersing it in a suitable coagulating bath or allowing the solvent water to evaporate and then treating it as before.

The method of casting or spinning a solution into a coagulating bath cannot, of course, be used when the cross-linking compound is excessively soluble in the coagulating bath.

After casting the composition in the form of a film or thread, the polyvinyl alcohol is then reacted with the cross-linking compound to such an extent that a high molecular weight complex molecule is formed, consisting of a number of polyvinyl alcohol molecules linked together by a number of molecules of the cross-linking compound. It is not sufficient, for example, merely to react a single molecule of the cross-linking compound with two molecules of polyvinyl alcohol. Such a compound may still be soluble in many solvents. By forming a complex molecule, comprising a long chain consisting of a number of polyvinyl alcohol units and a number of cross-linking units, the resulting compound is insoluble both in water and all ordinary solvents. Ordinarily this reaction is effected by heating the dried coagulated thread, film, or the like. In some cases, however, depending upon the particular cross-linking compound being used, the reaction takes place so readily and at such relatively low temperatures that it will be accomplished during the drying of the thread, film or the like, or even during formation of the thread, film or the like, particularly if such formation is effected by heating in a dry or evaporative atmosphere, or by coagulation in a relatively hot coagulating bath. In the case of polycarboxylic acids, for example, the temperature required will ordinarily be in excess of 100° C., and the reaction will be effected by heating after drying. In the case of polyhalogenated compounds, on the other hand, temperatures as low as 75° C. may be employed. In the case of dimethylolurea resin, temperatures of as low as 50° C. may be employed. The time required to complete the reaction will also depend upon the temperature being used and the compound taking part in the reaction. Generally, and particularly when dealing with continuous processes, the higher temperatures and shorter reaction periods will be preferred. The temperature should not, of course, be so high that it will decompose or otherwise deleteriously affect any of the materials entering into the reaction.

The conversion to the water and solvent insoluble state may be hastened by adding a catalyst at any suitable stage in the progress, either before, during or after coagulation. A catalyst is conveniently added to one of the washing or treating baths following coagulation. The type of catalyst which can be used, of course, depends upon the type of cross-linking compound employed. In the case of polyhalogenated compounds, for example, alkaline catalysts, such as sodium bicarbonate, may be employed. In the case of polycarboxylic acids, on the other sand, acid catalysts, such as hydrochloric acid, hydrobromic acid, aromatic sulfonic acids such as benzene sulfonic acid, and bromo succinic anhydride are customarily employed.

The polyvinyl alcohol may be reacted with the cross-linking compound at any suitable stage during or after the film, thread, or the like is actually formed. It may be heated before or after the thus formed structure is washed or otherwise treated or purified. It may be heated before, during or after drying. In the case of a film, it even may be heated before being stripped from the casting support.

The quantity of cross-linking compound to be included in the composition may, of course, be varied widely, depending upon its water solubility and compatibility with polyvinyl alcohol as well as the characteristics desired in the final product.

The following specific examples are given for the purpose of promoting a better understanding of the invention and it will, of course, be understood that they are not to be considered limitative:

Example I

A mixture comprising 40 grams of a 20% solution of polyvinyl alcohol in water, 4 grams of methacrylic acid monomer and 10 grams of water is heated at 90° C. for 16 hours to effect polymerization of the methacrylic acid. The resulting compatible composition remains clear and is then cast into a clear film on a glass plate or any other suitable casting surface. After evaporating the water, the dry film is heated for 5 minutes at a temperature of 140° C. which causes the polyvinyl alcohol to react with the polymethacrylic acid to form a clear film which is insoluble in hot water and most organic solvents.

Example II

A mixture containing 400 grams of a 15% solution of polyvinyl alcohol in water and 7 grams of sebacic acid is heated at 90° C. with stirring until a clear, homogeneous solution is obtained. This composition is cast in the form of a thin film which, after thoroughly drying, is heated at a temperature of 110° C. for 16 hours. This causes a reaction between the polyvinyl alcohol and sebacic acid to form a film which is substantially insoluble in water and most organic solvents.

Example III

A mixture comprising 200 grams of a 15% solution of polyvinyl alcohol in water and 3 grams of 2,3-dichlorodioxane is thoroughly mixed and heated at a temperature of 40° C. until a clear solution is obtained. The solution is cast in the form of a film upon a glass plate and the resulting film is dried at a temperature of 90° C. for from 15 to 20 minutes, whereby the film is rendered insoluble in water and in most organic solvents.

Example IV

A mixture consisting of 60 grams of a 15% polyvinyl alcohol solution in water, 30 grams of methacrylic acid monomer and 1.5 grams of benzoyl peroxide is heated at 90° C. for 5 hours, then at 75–80° C. for 16 hours to effect polymerization of the methacrylic acid. After filtration, the solution is heated to 75° C. and spun from a multiple hole spinneret directly into an aqueous 35% solution of ammonium sulfate maintained at a temperature of 45–50° C. The resulting filaments are rendered water insoluble by heating at a temperature of approximately 110° C. for a period of 3 hours.

Example V

A mixture of 30 grams of polyvinyl alcohol, 10 grams of water soluble dimethylolurea resin and 200 grams of water is spun through a multiple hole spinneret into a coagulating bath consisting of a 35% solution of ammonium sulfate in water which is maintained at a temperature of 40–50° C. After a travel of 24 inches, the coagulated filaments are withdrawn from the bath at the rate of about 120 feet per minute, washed free of coagulating solution in cold water or other suitable liquid, dried in a current of warm air and wound on a bobbin. Alternatively, the freshly coagulated threads may be immediately collected in the centrifugal bucket and subsequently washed and dried. The dried filaments are then subjected to a temperature of 90° C. for a period of one hour. The dimethylolurea resin reacts with the polyvinyl alcohol to form a cross-linked structure, thus rendering it insoluble in water and in most organic solvents.

By similar procedures, the compositions may be converted into caps, ribbons, sausage casings and the like.

The use of the present invention has the distinctive advantage of enabling films, threads and the like to be cast from water solution while at the same time they may be readily insolubilized to water and most organic and inorganic solvents simply and effectively, such as by heating at a moderately elevated temperature. For example, they are insoluble in chloroform, dioxane, benzene, toluene, alcohol, ethyl acetate, acetone, or mixtures of these materials. It is, of course, obvious that water is a cheap solvent and that decided economy may be effected by its use not only by virtue of its cheapness, but also by virtue of the fact that all question of solvent recovery is eliminated. The films resulting from the practice of this invention, particularly that form in which the polyvinyl alcohol is reacted with polymethacrylic acid, are transparent, insoluble in water and relatively firm in character so that handling in machinery is facilitated.

Any variation or modification of the invention, as described above, which conforms to the spirit of the invention, is intended to be included within the scope of the claims.

I claim:

1. The method of forming films, threads, and the like from polyvinyl alcohol comprising forming an aqueous solution of polyvinyl alcohol and a polycarboxylic acid in which the carboxyl groups are separated by at least two carbon atoms, forming said solution into a film, thread, or the like, and heating the thus formed structure at a temperature sufficient to cause said polyvinyl alcohol to react with said polycarboxylic acid to form a cross-linked structure insoluble in water and most solvents.

2. The method of forming films, threads, and the like from polyvinyl alcohol comprising forming an aqueous solution of polyvinyl alcohol and a polycarboxylic acid in which the carboxyl groups are separated by at least two carbon atoms, forming said solution into a film, thread, or the like, and heating the thus formed structure at a temperature of at least 100° C. to cause the polyvinyl alcohol to react with said polycarboxylic acid to form a cross-linked structure insoluble in water and most solvents.

3. The method of forming films, threads, and the like from polyvinyl alcohol comprising forming an aqueous solution of polyvinyl alcohol and a polycarboxylic acid taken from the class consisting of polyacrylic acid and its homologues substituted in the alpha position by a hydrocarbon radical, forming said solution into a film, thread, or the like, and heating the thus formed structure at a temperature sufficient to cause the polyvinyl alcohol to react with said acid to form a cross-linked structure insoluble in water and most solvents.

4. The method of forming films, threads, and the like from polyvinyl alcohol comprising forming an aqueous solution of polyvinyl alcohol and polymethacrylic acid, forming said solution into a film, thread, or the like, and heating the thus formed structure at a temperature sufficient to cause the polyvinyl alcohol to react with the polymethacrylic acid to form a cross-linked structure insoluble in water and most solvents.

5. The method of forming films, threads, and the like from polyvinyl alcohol comprising forming an aqueous solution of polyvinyl alcohol and monomeric methacrylic acid, polymerizing said methacrylic acid, forming said solution into a film, thread, or the like, and heating the thus formed structure at a temperature sufficient to cause the polyvinyl alcohol to react with the polymethacrylic acid to form a cross-linked structure insoluble in water and most solvents.

6. The method of forming films, threads, and the like from polyvinyl alcohol comprising forming an aqueous solution of polyvinyl alcohol and monomeric methacrylic acid, polymerizing said methacrylic acid, forming said solution into a film, thread, or the like, and heating the thus formed structure at a temperature of at least 100° C. to cause the polyvinyl alcohol to react with the polymethacrylic acid to form a cross-linked structure insoluble in water and most solvents.

7. Films, threads or the like the structure of which is comprised of the reaction product of polyvinyl alcohol and a polycarboxylic acid in which the carboxyl groups are separated by at least two carbon atoms, said reaction product being a high molecular weight cross-linked structure insoluble in water and most solvents.

8. Films, threads or the like the structure of which is comprised of the reaction product of polyvinyl alcohol and polymethacrylic acid, said reaction product being a high molecular weight cross-linked structure insoluble in water and most solvents.

EMMETTE F. IZARD.